US012762676B2

(12) United States Patent
Nishida et al.

(10) Patent No.: US 12,762,676 B2
(45) Date of Patent: Oct. 13, 2026

(54) IMAGE PROCESSING VERIFICATION SYSTEM

(71) Applicant: FUJI CORPORATION, Chiryu (JP)

(72) Inventors: Kenshiro Nishida, Handa (JP); Takahiro Kobayashi, Chiryu (JP); Yuta Yokoi, Kariya (JP)

(73) Assignee: FUJI CORPORATION, Chiryu (JP)

( * ) Notice: Subject to any disclaimer, the term of this patent is extended or adjusted under 35 U.S.C. 154(b) by 134 days.

(21) Appl. No.: 18/725,870

(22) PCT Filed: Jan. 13, 2022

(86) PCT No.: PCT/JP2022/000870
§ 371 (c)(1),
(2) Date: Jul. 1, 2024

(87) PCT Pub. No.: WO2023/135701
PCT Pub. Date: Jul. 20, 2023

(65) Prior Publication Data
US 2025/0078237 A1 Mar. 6, 2025

(51) Int. Cl.
*G06T 7/00* (2017.01)
*G06T 7/70* (2017.01)

(52) U.S. Cl.
CPC .............. *G06T 7/0002* (2013.01); *G06T 7/70* (2017.01); *G06T 2200/24* (2013.01)

(58) Field of Classification Search
None
See application file for complete search history.

(56) References Cited

U.S. PATENT DOCUMENTS

2017/0307480 A1* 10/2017 Uchida ................. G01M 15/02

FOREIGN PATENT DOCUMENTS

| | | | | |
|---|---|---|---|---|
| JP | 5-242161 A | 9/1993 | | |
| JP | 2008-197772 A | 8/2008 | | |
| JP | 2013-121448 A | 6/2013 | | |
| WO | WO-2015015567 A1 * | 2/2015 | ......... | H05K 13/0882 |

OTHER PUBLICATIONS

Shibuya et al. JPWO-2015015567-A1 English Translation (Year: 2015).*
International Search Report mailed on Mar. 29, 2022 in PCT/JP2022/000870 filed on Jan. 13, 2022 (2 pages).

* cited by examiner

*Primary Examiner* — Miya J Cato
(74) *Attorney, Agent, or Firm* — Oblon, McClelland, Maier & Neustadt, L.L.P.

(57) ABSTRACT

An image processing verification system is a system for verifying image processing performed on an image of a component captured by an image capturing device based on processing information set in advance. The system includes an editing section configured to edit the processing information; and a display section configured to sort and display a set of image processing results of the image processing separately performed on the captured image before and after the editing of the processing information.

6 Claims, 5 Drawing Sheets

Fig. 4

NARROW DOWN SORT

| PROCESSING RESULT IMAGE | BEFORE EDITING OF SHAPE DATA | AFTER EDITING OF SHAPE DATA | DIFFERENCE |
| --- | --- | --- | --- |
| 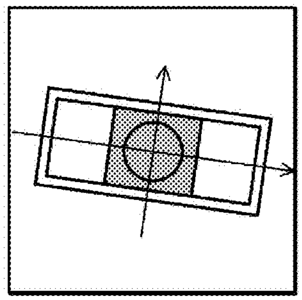 | X:2.0 mm<br>Y:1.0 mm<br>θ:3 dgrees<br>Error:NG | X:2.1 mm<br>Y:1.1 mm<br>θ:2 dgrees<br>Error:OK | X:+0.1mm<br>Y:+0.1mm<br>θ:−1 dgrees<br>Error:NG⇒OK |
| 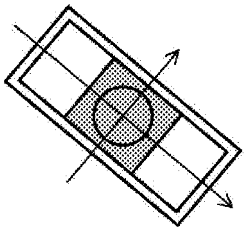 | X:2.1 mm<br>Y:0.9 mm<br>θ:5 dgrees<br>Error:NG | X:2.1 mm<br>Y:1.0 mm<br>θ:5 dgrees<br>Error:NG | X:0 mm<br>Y:+0.1mm<br>θ:0 dgrees<br>Error:NG⇒NG |
| 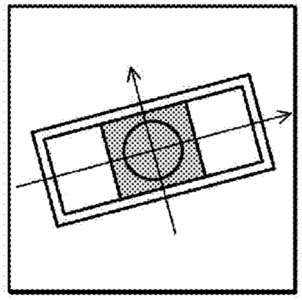 | X:2.0 mm<br>Y:1.0 mm<br>θ:−2 dgrees<br>Error:OK | X:2.1 mm<br>Y:0.9 mm<br>θ:−1 dgrees<br>Error:OK | X:+0.1 mm<br>Y:−0.1 mm<br>θ:+1 dgrees<br>Error:OK⇒OK |

PREVIOUS NEXT

Fig. 5

NARROW DOWN:

- [x] THERE IS DIFFERENCE IN POSITIONING RESULT
- [ ] THERE IS DIFFERENCE IN ERROR INFORMATION

SELECT

IMAGE PROCESSING VERIFICATION SYSTEM

TECHNICAL FIELD

The present description discloses an image processing verification system.

BACKGROUND ART

Conventionally, an image processing verification system that reproduces and verifies image processing is known. For example, Patent Literature 1 discloses, as a procedure for reproducing and verifying image processing, a technique in which shape data is created, a database (test sample) in which a desired image processing result is expected is prepared, an image processing test is performed using the database, and when an image processing result against the expectation is obtained, the shape data is corrected and the image processing test is re-executed until the expected image processing result is obtained.

PATENT LITERATURE

Patent Literature 1: JP-A-2008-197772

BRIEF SUMMARY

Technical Problem

As the number of test samples increases, an image processing test with higher coverage can be performed, but the result of the image processing test needs to be checked with eyes of a user. For example, when the shape data is corrected in response to the fact that the image processing result against the expectation is obtained, the user needs to check the captured image and the image processing result so that division between normality and abnormality in normality determination performed in the image processing is performed as intended. Therefore, when the number of test samples is increased in order to perform performance check with high coverage, the number of check steps corresponding to the number of test samples is required, and the burden on the user increases.

A main object of the present disclosure is to provide an image processing verification system with which a burden on a user can be reduced in a check operation for obtaining an intended image processing result.

Solution to Problem

The present disclosure employs the following means in order to achieve the main object described above.

A first image processing verification system of the present disclosure is an image processing verification system for verifying image processing performed on a captured image of a component captured by an image capturing device based on processing information set in advance, the image processing verification system including:

an editing section configured to edit the processing information; and a display section configured to sort and display a set of image processing results of the image processing separately performed on the captured image before and after the editing of the processing information.

In the first image processing verification system of the present disclosure, a set of image processing results of the image processing separately performed on the captured image before and after the editing of the processing information is sorted and displayed. Accordingly, the user can easily check whether the image processing is adjusted by the editing of the processing information as intended, by comparing the image processing results before and after the editing of the processing information. As a result, it is possible to reduce a burden on the user in a check operation for obtaining an intended image processing result.

A second image processing verification system of the present disclosure is an image processing verification system for verifying image processing performed on a captured image of a component captured by an image capturing device based on processing information set in advance, the image processing verification system including:

an editing section configured to edit the processing information; and a display section configured to display a difference between image processing results of the image processing separately performed on the captured image before and after the editing of the processing information.

In the second image processing verification system of the present disclosure, a difference between image processing results of the image processing separately performed on the captured image before and after the editing of the processing information is displayed. Accordingly, the user can easily check whether the image processing is adjusted by the editing of the processing information as intended, by checking the difference between the image processing results before and after the editing of the processing information. As a result, it is possible to reduce the burden on the user in the check operation for obtaining the intended image processing result.

BRIEF DESCRIPTION OF DRAWINGS

FIG. 4 is a diagram illustrating an example of display information.

FIG. 5 is a diagram illustrating an example of a narrowing-down condition selection screen.

DESCRIPTION OF EMBODIMENTS

Next, an embodiment of the present disclosure will be described with reference to the drawings.

Figure 1:
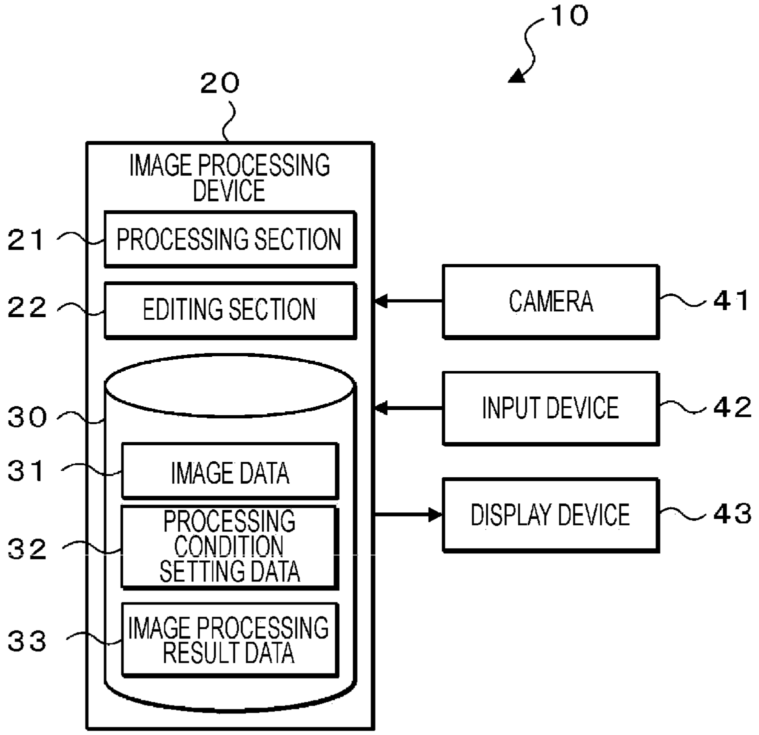
FIG. 1 is a schematic configuration diagram of an image processing verification system of the present embodiment.

FIG. 1 is a schematic configuration diagram of an image processing verification system of the present embodiment. Image processing verification system 10 of the present embodiment is a system for verifying whether image processing of image processing device 20 is performed as expected by a user. Image processing verification system 10 includes, in addition to image processing device 20, camera 41, input device 42 such as a mouse or a keyboard, and display device 43 as a display.

Image processing device 20 includes processing section 21, editing section 22, and storage section 30.

For example, in a component mounter that picks up a component with a suction nozzle and mounts the component on a board, processing section 21 processes an image, which is captured by camera 41, of the component picked up by the suction nozzle and checks whether there is a pickup deviation of the component. In addition, for example, processing section 21 processes an image, which is captured by camera 41, of the component mounted on the board, and checks presence or absence of a mounting deviation of the component.

Processing section 21 also has a function of reproducing and verifying image processing from multiple test samples (images of components).

Storage section 30 is configured as a storage device such as a hard disk drive or a solid state drive. Storage section 30 stores image data 31, processing condition setting data 32, and image processing result data 33. Image data 31 includes an image of a component captured by camera 41. In the present embodiment, all images captured during production in the component mounter are stored in storage section 30. Processing condition setting data 32 includes parameters necessary for image processing performed by image processing device 20. For example, processing condition setting data 32 includes shape data including outer shape data (part data) of the component, tolerance data that is an allowable range of a positional deviation or an angular deviation of the component, and the like, an image capturing condition (light source type), resolution of a camera, calibration data (distortion correction value of the camera), and the like. Image processing result data 33 includes a position (X coordinate value, Y coordinate value) and an angle (θ angle value) of the component specified by the image processing, information (presence or absence of an image processing error and an error code) indicating whether a positional deviation or an angular deviation of the component is within an allowable range, and the like.

Editing section 22 edits the above-described data such as the shape data and the image capturing condition based on an input operation of input device 42 performed by the user.

Figure 2:
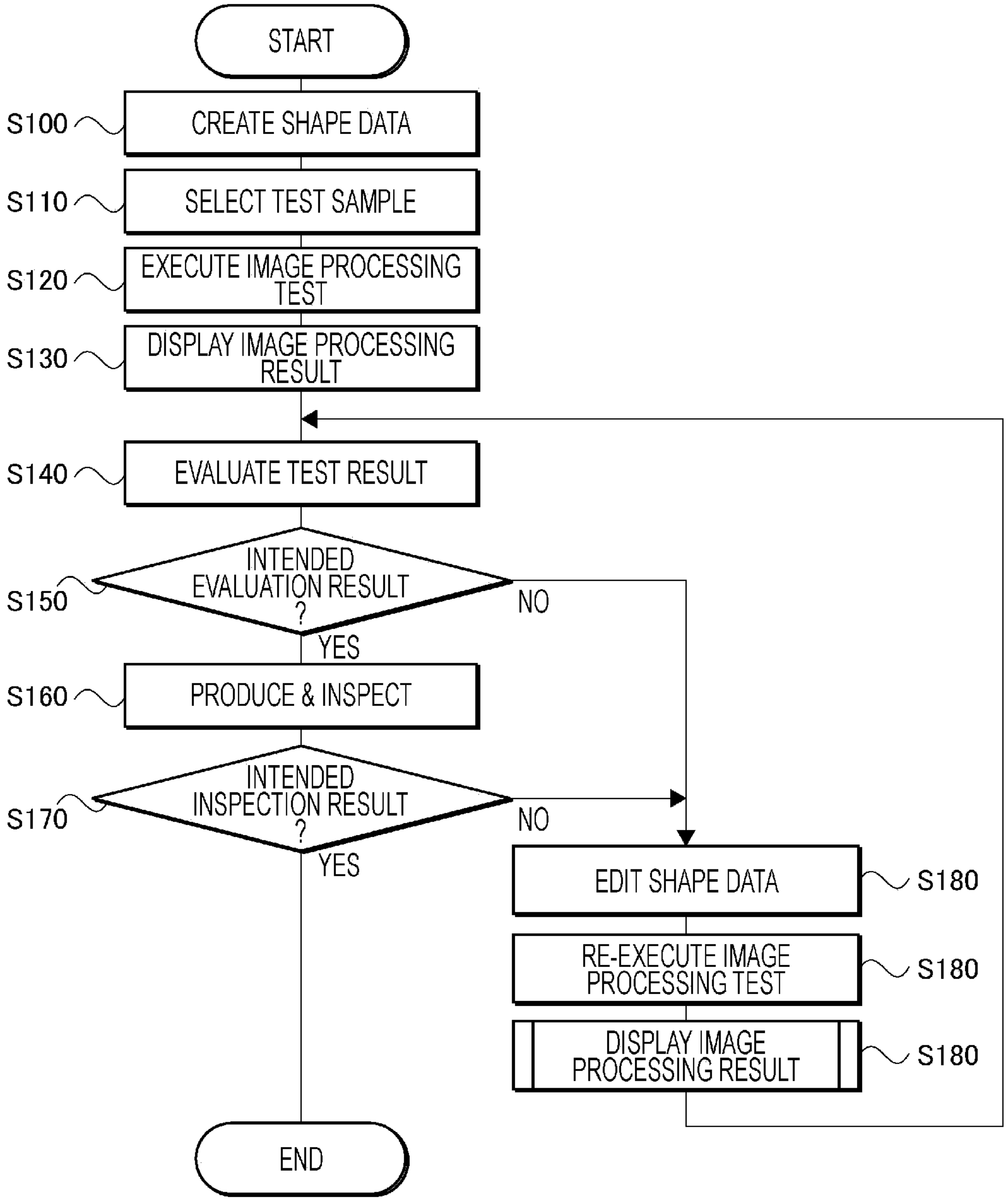
FIG. 2 is a diagram illustrating an example of an execution procedure of an image processing test.

Next, a procedure for verifying image processing performed by image processing device 20 using image processing verification system 10 of the present embodiment configured as described above will be described. FIG. 2 is a diagram illustrating an example of an execution procedure of an image processing test.

First, shape data is created (S100). The creation of the shape data can be performed by the user operating input device 42 to input a numerical value of a component shape or to extract component shape data from drawing data of the component. The generated shape data is stored in storage section 30 as processing condition setting data 32.

Next, a test sample is selected from image data 31 stored in storage section 30 (S110). The selection of the test sample may be performed, for example, by the user selecting a certain image from image data 31 stored in storage section 30, or by the user designating a search condition so that image processing device 20 searches storage section 30 for an image matching the search condition. Examples of the search condition include a condition of a designated nozzle type, a condition of a designated component lot, a condition of a designated camera, and a condition that an image processing error occurs in a designated error code.

Next, the image processing test is executed by processing section 21 (S120). The image processing test is performed by performing the image processing on the test sample selected in S110 based on processing condition setting data 32 including the shape data created by processing section 21 in S100. For example, processing section 21 specifies a component captured in the test sample by edge extraction, calculates a position and an angle thereof, and determines whether each of a positional deviation and an angular deviation of the component is within the allowable range based on the tolerance data. When both the positional deviation and the angular deviation of the component are within the allowable range, processing section 21 determines that the image processing result is normal. On the other hand, when one of the positional deviation and the angular deviation of the component is not within the allowable range, processing section 21 determines that an image processing error has occurred. Then, processing section 21 stores the image processing result as image processing result data 33 in storage section 30.

Then, the image processing result is displayed on display device 43 by processing section 21 (S130). The image processing result is displayed by displaying an image of the component after the image processing, the position (X coordinate value, Y coordinate value) and the angle (θ angle value) of the component, and error information (presence or absence of an image processing error ("PASS", "FAIL")) on display device 43.

Next, a test result of the image processing test is evaluated (S140). The evaluation of the test result is performed by checking the image processing result displayed on display device 43 with the eyes of the user. For example, the user checks whether the image processing result of the test sample expected to be normal is normal as expected or whether the image processing result of the test sample expected to be an error is an error as expected.

When the evaluation of the test result is as expected ("YES" in S150), an inspection of the component the image of which is captured by camera 41 is started by the image processing based on processing condition setting data 32 including the shape data created in S100 upon starting production (S160). When an intended inspection result is obtained for a certain period of time ("YES" in S170), the verification of the image processing is terminated.

On the other hand, when the evaluation of the test result is not as expected ("NO" in S150) or when the inspection result is not as expected ("NO" in S170), the shape data or the like is edited by editing section 22 (S180). The editing of the shape data is performed by the user operating input device 42 to change each numerical value of the part data, the tolerance data, and the like. Note that editing section 22 may be capable of editing other data such as the image capturing condition in addition to the shape data.

Figure 3:
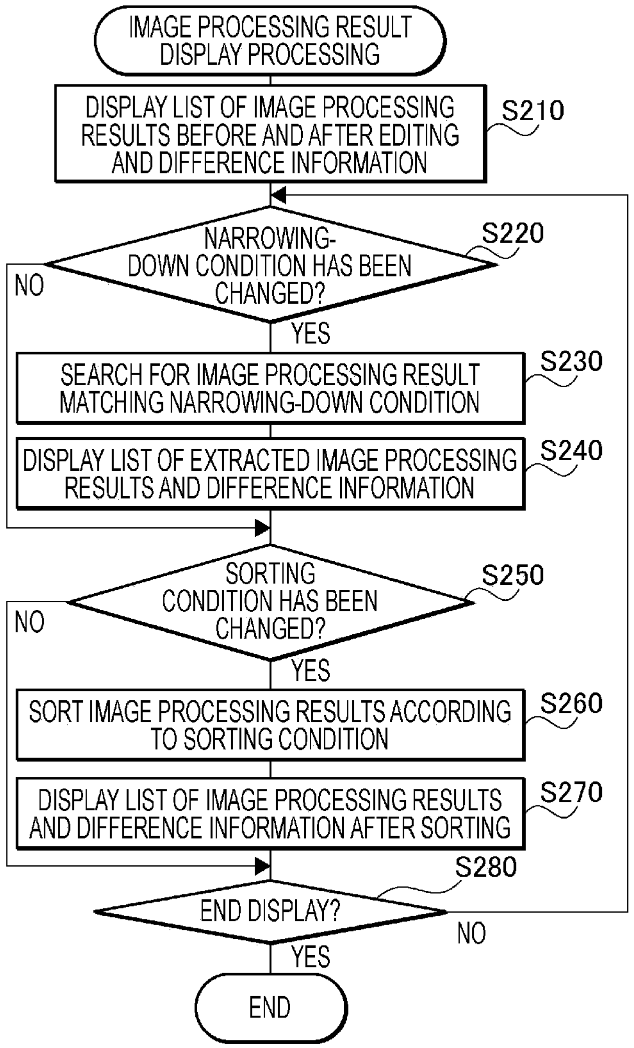
FIG. 3 is a flowchart illustrating an example of image processing result display processing.

Then, the image processing is re-executed on the test sample by processing section 21 using processing condition setting data 32 including the shape data edited in S180 (S190), the image processing result is displayed (S200), and the process returns to S140. Thus, when an intended evaluation result or inspection result is not obtained, the editing of the shape data and the re-execution of the image processing test are repeated until the intended result is obtained. The display of the image processing result after editing the shape data is performed by displaying a set of results of image processing separately executed before and after the editing and difference information thereof on display device 43. FIG. 3 is a flowchart illustrating an example of an image processing result display processing performed by processing section 21 after the shape data is edited.

In the image processing result display device, processing section 21 (CPU) first displays a list of display information including the image processing results before and after the editing and the difference information thereof on display device 43 (S210). FIG. 4 shows an example of the display information displayed on display device 43. As shown in the drawing, the display information includes the image of the component after the image processing, the image processing result before the editing of the shape data, the image processing result after the editing of the shape data, and the difference information between both the image processing results. The display information is displayed in a list up to a predetermined number (for example, three) in one screen, proceeds to the next screen as a next button is operated, and returns to the previous screen as a previous button is operated. The display information also includes a narrowing-down button for designating a narrowing-down condition and a sorting button for designating a sorting condition. The difference information includes a difference between positions (X coordinate values, Y coordinate values) and a difference between angles (θ angle value) of the component before and after the editing of the shape data, and each piece of error information (presence or absence of an image processing error ("PASS", "FAIL")) before and after the editing of the shape data. Accordingly, the user can check how the image processing result has changed before and after the editing of the shape data, and can easily determine whether the editing of the shape data is appropriate.

Next, processing section 21 determines whether the narrowing-down condition has been changed (S220). Here, as illustrated in FIG. 5, examples of the narrowing-down condition include a condition that there is a difference of a certain value or more in the positioning result (any of the X coordinate value, the Y coordinate value, and the θ angle value) and a condition that there is a difference in the error information ("PASS", "FAIL"). Note that the narrowing-down condition may include a condition that the pickup is performed with a designated nozzle type, a condition that an image is captured under a designated image capturing condition. The narrowing-down condition is designated by the user operating input device 42 to select one of multiple conditions. When it is determined that the narrowing-down condition has been changed, processing section 21 searches image processing result data 33 of storage section 30 for the image processing result data matching the changed narrowing-down condition (S230), and displays a list of the searched image processing result data and the difference information thereof up to a predetermined number (S240). On the other hand, when it is determined that the narrowing-down condition has not been changed, processing section 21 proceeds to S250.

Figure 6:
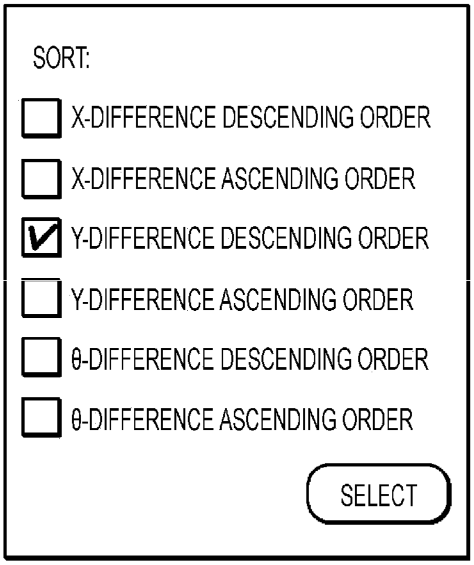
FIG. 6 is a diagram illustrating an example of a sorting condition selection screen.

Next, processing section 21 determines whether the sorting condition has been changed (S250). Here, as shown in FIG. 6, the sorting condition includes an X-difference descending order in which differences between the X coordinate values before and after the editing of the shape data are sorted in descending order (in order from the larger difference), and the X-difference ascending order in which differences between the X coordinate values before and after the editing of the shape data are sorted in ascending order (in order from the smaller differences). Furthermore, the sorting condition includes a Y-difference descending order in which differences between Y coordinate values before and after the editing of the shape data are sorted in descending order, the Y-difference ascending order in which differences between Y coordinate values before and after the editing of the shape data are sorted in ascending order, a θ-difference descending order in which differences between θ angle values before and after the editing of the shape data are sorted in descending order, and the θ-difference ascending order in which differences between θ angle values before and after the editing of the shape data are sorted in ascending order. The sorting in ascending order may be omitted from options. The sorting condition is designated by the user operating input device 42 to select one of multiple conditions. When it is determined that the sorting condition has been changed, processing section 21 sorts pieces of display information under the changed sorting condition (S260), and displays a list of the sorted pieces of display information up to a predetermined number in order (S270). On the other hand, when it is determined that the sorting condition has not been changed, processing section 21 proceeds to S280.

Then, processing section 21 determines whether an end of the display is selected (S280), and when it is determined that the end of the display has not been selected, processing section 21 returns to S220 and repeats the processing, and when it is determined that the end of the display is selected, processing section 21 ends the image processing result display processing.

Here, a correspondence relationship between elements of the embodiment and elements of the present disclosure described in the claims will be described. That is, editing section 22 of the present embodiment corresponds to an editing section of the present disclosure, and display device 43 corresponds to a display section. Storage section 30 corresponds to a storage section, input device 42 and processing section 21 that executes S220 of the image processing result display processing correspond to a designation section, and processing section 21 that executes S230 of the image processing result display processing corresponds to a search section.

It is needless to say that the present disclosure is not in any way limited to the above-described embodiment, and the present disclosure can be achieved in various aspects as long as the aspects fall within the technical scope of the present disclosure.

For example, in the embodiment described above, processing section 21 displays the image processing result before and after the editing of the shape data or the like and the difference information thereof simultaneously on display device 43, but only one of these may be displayed.

In the above-described embodiment, editing section 22 is built in image processing device 20, but may be provided separately from image processing device 20. Storage section 30 is built in image processing device 20, but may be externally attached to image processing device 20.

As described above, in a first image processing verification system of the present disclosure, a set of image processing results of the image processing separately performed on the captured image before and after the editing of the processing information is sorted and displayed. Accordingly, the user can easily check whether the image processing is adjusted by the editing of the processing information as intended, by comparing the image processing results before and after the editing of the processing information. As a result, it is possible to reduce the burden on the user in the check operation for obtaining the intended image processing result.

The first image processing verification system of the present disclosure may include: a storage section configured to store multiple sets of the image processing results: a designation section configured to designate a predetermined narrowing-down condition; and a search section configured to search the storage section for a set of the image processing results matching the designated narrowing-down condition, in which the display section may display the set of the image processing results searched for by the search section. In this way, even when the image processing test is performed using a large number of test samples, it is possible to easily find an image processing result that needs to be checked. In this case, the predetermined narrowing-down condition may include a condition that there is a difference of a certain value or more between positions of the component specified by the image processing before and after the editing of the processing information, or a condition that there is a difference between results of normality determination performed in the image processing before and after the editing of the processing information.

The first image processing verification system of the present disclosure may further include: a storage section configured to store multiple sets of the image processing results, in which the display section may sort the multiple sets of the image processing results stored in the storage section according to a predetermined sorting condition and display the sorted sets up to a predetermined number. In this way, even when the image processing test is performed using a large number of test samples, it is possible to easily find an image processing result that needs to be checked. In this case, the predetermined sorting condition may include a condition that differences between positions of the component specified by the image processing before and after the editing of the processing information are sorted in ascending order or descending order.

In a second image processing verification system of the present disclosure, a difference between image processing results of the image processing separately performed on the captured image before and after the editing of the processing information is displayed. Accordingly, the user can easily check whether the image processing is adjusted by the editing of the processing information as intended, by checking the difference between the image processing results before and after the editing of the processing information. As a result, it is possible to reduce the burden on the user in the check operation for obtaining the intended image processing result.

INDUSTRIAL APPLICABILITY

The present disclosure is applicable to a manufacturing industry of an image processing device or a component mounter.

REFERENCE SIGNS LIST

10: image processing verification system, 20: image processing device, 21: processing section, 22: editing section, 30: storage section, 31: image data, 32: processing condition setting data, 33: image processing result data, 41: camera, 42: input device, 43: display device

The invention claimed is:

1. An image processing verification system for verifying image processing performed on a captured image of a component imaged by an image capturing device based on processing information set in advance, the image processing verification system comprising:

a processor configured to edit the processing information;

a display configured to sort and display a set of image processing results of the image processing separately performed on the captured image before and after the editing of the processing information, and the captured image of the component after the editing of the processing information, the image processing results including numerical X coordinate values, numerical Y coordinate values, numerical angle values, and presence or absence of an image processing error; and a storage device configured to store multiple sets of the image processing results, wherein the processor is further configured to designate a predetermined narrowing-down condition, and search the storage device for a set of the image processing results matching the designated narrowing-down condition, wherein the display is configured to display the set of the image processing results searched for by the processor, and wherein the display is configured to sort the multiple sets of the image processing results stored in the storage device according to a predetermined sorting condition and displays the sorted sets up to a predetermined number.

2. The image processing verification system according to claim 1, wherein the predetermined narrowing-down condition includes a condition that there is a difference of a certain value or more between positions of the component specified by the image processing before and after the editing of the processing information, or a condition that there is a difference between results of normality determination performed in the image processing before and after the editing of the processing information.

3. The image processing verification system according to claim 1, wherein the predetermined sorting condition includes a condition that differences between positions of the component specified by the image processing before and after the editing of the processing information are sorted in ascending order or descending order.

4. An image processing verification system for verifying image processing performed on a captured image of a component imaged by an image capturing device based on processing information set in advance, the image processing verification system comprising:

a processor configured to edit the processing information;

a display configured to display a difference between image processing results of the image processing separately performed on the captured image before and after the editing of the processing information, and the captured image of the component after the editing of the processing information, the difference between image processing results including a numerical difference in X coordinate values, a numerical difference in Y coordinate values, a numerical difference in angle values, and a difference in presence or absence of an image processing error; and a storage device configured to store multiple sets of the image processing results, wherein the processor is further configured to designate a predetermined narrowing-down condition, and search the storage device for a set of the image processing results matching the designated narrowing-down condition, wherein the display is configured to display the set of the image processing results searched for by the processor, and wherein the display is configured to sort the multiple sets of the image processing results stored in the storage device according to a predetermined sorting condition and displays the sorted sets up to a predetermined number.

5. The image processing verification system according to claim 4, wherein the predetermined narrowing-down condition includes a condition that there is a difference of a certain value or more between positions of the component specified by the image processing before and after the editing of the processing information, or a condition that there is a difference between results of normality determination performed in the image processing before and after the editing of the processing information.

6. The image processing verification system according to claim 4, wherein the predetermined sorting condition includes a condition that differences between positions of the component specified by the image processing before and after the editing of the processing information are sorted in ascending order or descending order.

* * * * *